(12) United States Patent
Berce et al.

(10) Patent No.: US 8,825,613 B2
(45) Date of Patent: Sep. 2, 2014

(54) INSTANCE SPACE BASED MANAGEMENT PACK INFRASTRUCTURE

(75) Inventors: Bogdan I. Berce, Seattle, WA (US); Joel F. Pothering, Seattle, WA (US); Bradley M. Hammond, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 12/475,650

(22) Filed: Jun. 1, 2009

(65) Prior Publication Data

US 2010/0306240 A1 Dec. 2, 2010

(51) Int. Cl.
 *G06F 17/30* (2006.01)
 *G06F 9/44* (2006.01)

(52) U.S. Cl.
 CPC .............................. *G06F 17/30917* (2013.01)
 USPC .......................................... 707/695; 717/120

(58) Field of Classification Search
 CPC .............................. G06F 17/30917; G06F 8/71
 USPC ................... 707/687, 695; 717/121, 126, 120
 See application file for complete search history.

(56) References Cited

U.S. PATENT DOCUMENTS

| | | | |
|---|---|---|---|
| 6,598,219 B1 | 7/2003 | Lau | |
| 7,500,150 B2 * | 3/2009 | Sharma et al. | 714/39 |
| 7,506,244 B1 | 3/2009 | Qin et al. | |
| 7,506,302 B2 | 3/2009 | Bahrami | |
| 7,865,888 B1 * | 1/2011 | Qureshi et al. | 717/168 |
| 7,895,574 B2 * | 2/2011 | Oustiougov et al. | 717/121 |
| 7,904,809 B2 * | 3/2011 | Corning et al. | 715/259 |
| 2004/0015834 A1 * | 1/2004 | Mestre et al. | 717/106 |
| 2004/0073565 A1 * | 4/2004 | Kaufman et al. | 707/101 |
| 2004/0199756 A1 * | 10/2004 | Graves et al. | 713/1 |
| 2005/0278270 A1 | 12/2005 | Carr et al. | |
| 2006/0161894 A1 * | 7/2006 | Oustiougov et al. | 717/121 |
| 2006/0282482 A1 | 12/2006 | Castro et al. | |
| 2007/0294704 A1 | 12/2007 | Stephen et al. | |
| 2008/0126221 A1 | 5/2008 | Swanson | |
| 2008/0163160 A1 | 7/2008 | Bloesch et al. | |
| 2008/0201465 A1 | 8/2008 | Jones et al. | |

OTHER PUBLICATIONS

Favre, Jean-Marie, "Meta-Model and Model Co-evolution within the 3D Software Space", First International Workshop on Evolution of Large-scale Industrial Software Applications, Retrieved at <<http://megaplanet.org/jean-marie-favre/papers/MetaModelAndModelCoEvolutionWithinThe3DSoftwareSpace.pdf>>, Sep. 23, 2003, pp. 12.

(Continued)

*Primary Examiner* — Jorge A Casanova
(74) *Attorney, Agent, or Firm* — Jim Sfekas; Kate Drakos; Micky Minhas

(57) ABSTRACT

Techniques are described herein for using a management pack to define a structure of management packs. A management pack is business logic expressed in terms of an extensible language, such as extensible markup language (XML). Instances of entities that are described by a management pack are stored in an instance space that is defined by the management pack. An entity can be a computer, software program, employee, customer, management pack, management pack element, or anything else in the system that an administrator may wish to describe. A management pack that defines the structure of management packs is referred to as a "management pack management pack" (MPMP). Accordingly, management packs (including MPMPs) having a structure that is defined by a MPMP are stored in an instance space that is defined by the MPMP. The instance space that is defined by the MPMP is materialized in a database.

20 Claims, 10 Drawing Sheets

(56) References Cited

OTHER PUBLICATIONS

Tan, et al., "A Model-Driven Cooperative Enterprise Process Enactment Environment", 12th International Conference on Computer Supported Cooperative Work in Design, Retrieved at <<http://ieeexplore.ieee.org/stamp/stamp.jsp?arnumber=04537111>>, Apr. 16-18, 2008, pp. 967-972.

Microsoft System Center, "Tracking Service Levels with Operations Manager 2007 R2", 2009, 2 pages.

* cited by examiner

INSTANCE SPACE BASED MANAGEMENT PACK INFRASTRUCTURE

BACKGROUND

Management packs are commonly used to describe computers and applications deployed thereon to facilitate monitoring and managing the computers and applications in a networked environment. A management pack is business logic expressed in terms of an extensible language, such as extensible markup language (XML). Each management pack traditionally has a hard-coded structure and includes a hard-coded set of management pack elements. The management pack elements include information regarding the computers or applications in a computer network. For example, such information typically includes rules, knowledge, public views, workflows, and user interface constructs.

Management pack elements traditionally are solution-specific. For instance, management packs often include management pack elements that specify custom classes for representing the types of computers or applications that are monitored in the computer network, custom actions that are to be taken in response to receiving notifications of events or alerts generated by the computers, custom methods for retrieving elements of the management packs, custom Structured Query Language (SQL) code to read and import management pack element types into respective custom tables of a database, etc.

The cost of introducing a new management pack element into a conventional management pack infrastructure is often substantial. For example, the addition of a management pack element often necessitates element-specific handling infrastructure for managing the authoring, validation, importing, and exporting functionality in a management pack schema that describes the new management pack element.

SUMMARY

Various approaches are described herein for, among other things, using a management pack to define a structure of management packs. A management pack is business logic expressed in terms of an extensible language, such as extensible markup language (XML). Instances of entities that are described by a management pack are stored in an instance space that is defined by the management pack. An instance space is a figurative or physical space that is described by a management pack for storing instances of entities that are defined by management packs. An entity can be a computer, software program, employee, customer, management pack, management pack element, or anything else in the system that an administrator may wish to describe. A management pack element includes information regarding an entity in a system, such as a description of the entity, operation(s) to be performed with respect to the entity, etc.

A management pack that defines the structure of management packs is referred to as a "management pack management pack" (MPMP). Accordingly, management packs (including MPMPs) having a structure that is defined by a MPMP are stored in an instance space that is defined by the MPMP. The instance space that is defined by the MPMP is materialized in a database. By "materialized", it is meant that the instance space is physically stored in the database.

An example method is described in which a MPMP is validated at a manager using processor(s) of the manager. A manager is a computer(s) (e.g., server) or other processing system that is configured to monitor and manage performance of clients, applications, IT services, and/or other managers in a networked environment. A client is a computer(s) or other processing systems that executes applications. The MPMP defines a structure of management pack(s). The MPMP is provided to an instance space that is described by the MPMP. The instance space is materialized in a database.

Another example method is described in which a MPMP is received at a database. The MPMP defines a structure of management pack(s). The MPMP is stored at the database in an instance space described by the MPMP.

An example manager is described that includes a validation module and a providing module. The validation module is configured to validate a MPMP that defines a structure of management pack(s). The providing module is configured to provide the MPMP to an instance space that is described by the MPMP. The instance space is materialized in a database.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
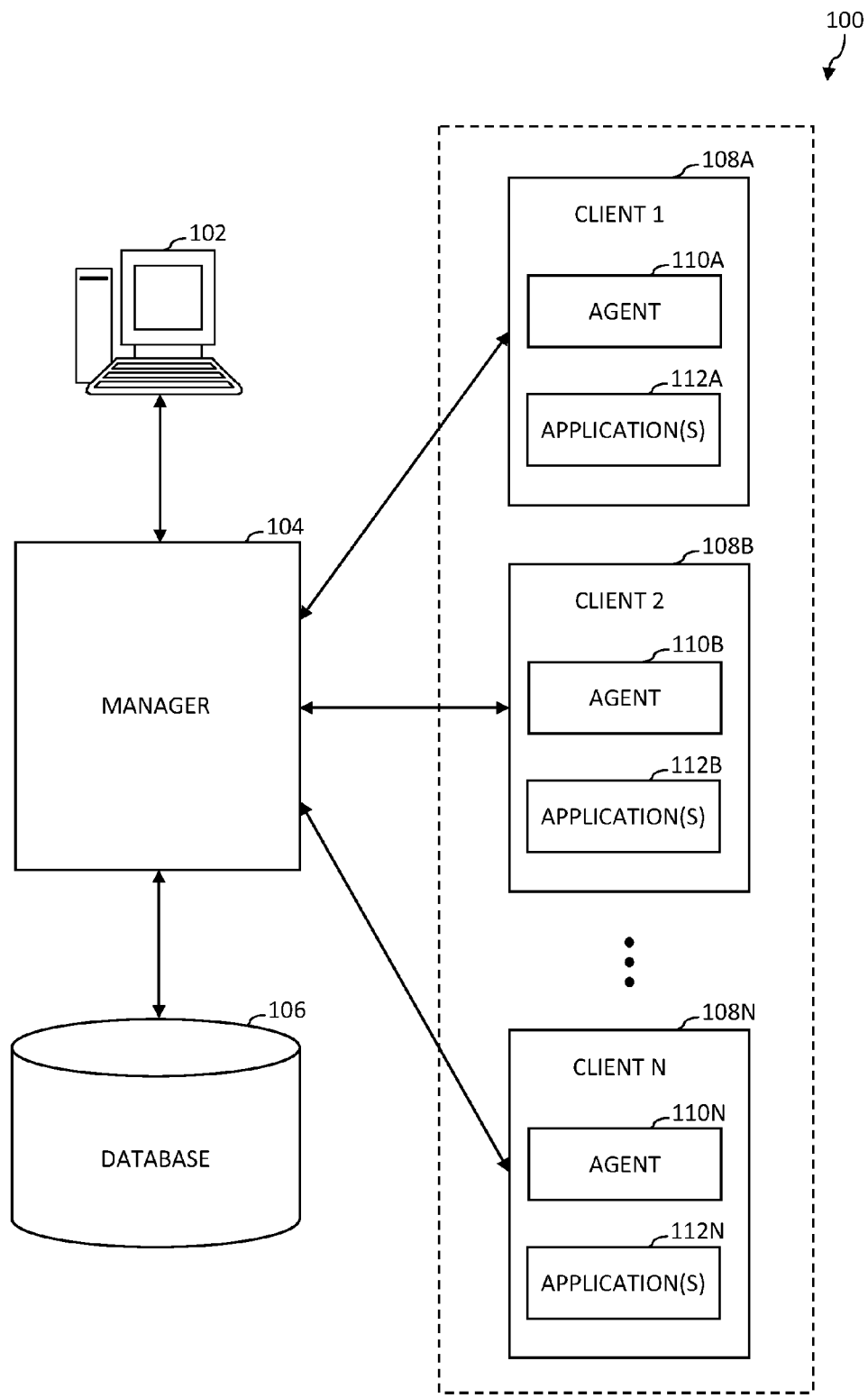
FIG. 1 is a block diagram of an example computer network in accordance with an embodiment.

The features and advantages of the disclosed technologies will become more apparent from the detailed description set forth below when taken in conjunction with the drawings, in

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Example embodiments use a management pack to define a structure of management packs. A management pack is business logic expressed in terms of an extensible language, such as extensible markup language (XML). A management pack includes one or more management pack elements. A management pack element includes information regarding an entity in a system, such as a description of the entity, operation(s) to be performed with respect to the entity, etc. An entity can be a computer, software program, employee, customer, management pack, management pack element, or anything else in the system that an administrator may wish to describe.

A management pack that defines the structure of management packs is referred to as a "management pack management pack" (MPMP). For example, the entities that are described by a MPMP may be management packs. Instances of entities that are described by a management pack are stored in an instance space that is defined by the management pack. An instance space is a figurative or physical space that is described by a management pack for storing instances of entities that are defined by management packs. Accordingly, management packs (including MPMPs) having a structure that is defined by a MPMP are stored in an instance space that is defined by the MPMP. The instance space that is defined by the MPMP is materialized in a database. By "materialized", it is meant that the instance space is physically stored in the database.

Example embodiments enable an extensible markup language (XML) schema that defines a static management pack structure to be extended based on a MPMP. Example embodiments are capable of treating instances and types of management pack elements uniformly. Example embodiments enable management pack elements to specify classes, actions, methods, Structured Query Language (SQL) code, etc. that are not solution-specific. For instance, such management pack elements may be reused among management packs having the structure defined by the MPMP. Example embodiments are capable of introducing management pack elements into an instance space based management pack infrastructure at a relatively low cost. For example, the instance space based management pack infrastructure may provide a common platform for managing authoring, validating, importing, and exporting management pack elements.

At least some of the management pack infrastructure may be automatically generated. For example, a manager may automatically generate the management pack model that is described as a management pack, the object model associated with the management pack, handlers for data transformation and/or validation of the management pack, readers for reading the management pack from a database, and/or writers for writing the management pack to the database, etc. In another example, the manager may perform serialization and/or de-serialization of the management pack into formats that are capable of being processed by databases and/or application programming interfaces (APIs), respectively. An example manager is discussed in further detail with respect to FIG. 1 below. Example embodiments may enable incremental updates to the instance space based management pack infrastructure and/or general maintenance work on the instance space based management pack infrastructure to be performed more easily, as compared to a conventional management pack infrastructure.

II. Example Embodiments for Instance Space Based Management of Management Pack Infrastructure The detailed description begins with a discussion of management packs (MPs) and some example types of management pack elements (MP elements) that may be included in management packs. An example computer network environment is then discussed to provide a context in which example structural and operational embodiments may be implemented. Finally, a more detailed discussion of the example structural and operational embodiments is provided.

A. Management Packs

A management pack is business logic expressed in terms of an extensible language, such as extensible markup language (XML). A management pack includes one or more management pack elements. A management pack element includes information regarding an entity in a system, such as a description of the entity, operation(s) to be performed with respect to the entity, etc. Entities can be computers, software programs, employees, customers, or anything else in the system that an administrator may wish to describe. In fact, management packs and management pack elements are entities in accordance with example embodiments. These example embodiments are discussed in greater detail in the following sections with reference to FIGS. 1-10. Further discussion of example types of management pack elements is provided in the following paragraphs of this section.

A management pack may be tailored to a particular environment. For purposes of illustration, management packs and management pack elements are described below in the context of monitoring and managing clients in a computer network and/or applications executed thereon. Persons skilled in the relevant art(s) will recognize that the example management packs and management pack elements described herein are provided for illustrative purposes and are not intended to be limiting. Example embodiments are applicable to any suitable management packs and/or management pack elements.

Example management pack element types include but are not limited to rules (e.g., business rules); rule groups; instances that the rules reference; scripts that rules call in response to events and/or alerts; computer groups based on attributes associated with computers; associations between computer groups and rule groups that specify rule targets; notification groups to indicate recipients of notifications based on the rules; view instance definitions that define how operations data produced by clients are to be viewed; tasks that may be used for managing an application; a service discovery class schema that defines the entities that are to be managed, their properties, and their relationships with other properties; a diagram definition that describes how service discovery data is to be viewed as a diagram from an application perspective; registry-based computer attributes that may be used for discovery; knowledge associated with the rules that specifies how problems are to be corrected and how the management pack is to be used, etc. Some of these example management pack element types are discussed in further detail below.

Rules specify how to collect, process, refine, and/or respond to data (e.g., events, alerts, performance data, etc.) generated by clients. For example, rules may include data providers, criteria, responses, a knowledge base, etc. A data provider identifies a source of data. For instance, the data provider may be used to determine how the data is to be collected. Criteria specify the conditions for matching the rule that includes the criteria with an instance of a management pack element. A response specifies an action(s) to be performed in response to an instance of the management pack element matching the rule that includes the response.

Rules may be grouped into rule groups, such that each rule group includes rules for monitoring respective aspects of entities. Example rule groups include but are not limited to event rules, alert rules and performance rules. Event rules specify how to respond to events or filter events that are generated by clients. Event collection rules specify events with one or more designated criteria to be collected from designated sources. Missing event rules specify an alert to be generated or a response to be initiated in response to an event not occurring within a designated period of time. Event consolidation rules group similar events that are generated by a client into a summary event. Event filtering rules specify designated events that are to be ignored.

Alert rules specify how to handle alert processing in response to alerts generated by the clients. For example, an alert rule may specify a response to be provided in response to an alert or a collection of pre-defined alerts.

Performance rules specify how to measure performance of the entities. For instance, performance rules may specify how performance counter data and numeric data are processed. Performance rules may include measuring rules that specify an algorithm for collecting numeric values from sources, such as Windows® or MAC OS X® performance counters. The measuring rules may include responses. Performance rules may include threshold rules that specify that an alert is generated or a response is initiated in response to a numeric value meeting or exceeding a designated threshold.

A knowledge base is information that is associated with a rule or a rule group. The information describes the meaning, importance, and possibly the resolution for a condition or problem that is associated with a rule. Information in a knowledge base that is generated by a user is referred to as "company knowledge". Such information may be added by the user when a rule is created or edited.

A computer group specifies a plurality of computers that is viewed and handled as a single entity. Computer group rules specify one or more criteria for grouping the plurality of computers. For example, a plurality of computers may be grouped based on domain membership, computer name, computer attributes, inclusion in a designated group, exclusion from a designated group, etc. Membership in a computer group may be determined dynamically. For instance, a Windows® 2007 computer group may be defined as all computers that are running Windows® 2007 Server. This group includes all the discovered computers that are running Windows® 2007 Server when the rule corresponding to the Windows® 2007 computer group is created and any computers for which Windows® 2007 Server is installed after the rule is created. However, if Windows® 2007 Server is removed from a computer, that computer is removed from the Windows® 2007 computer group because the computer no longer satisfies the criteria specified by the rule. Computers in the network may be periodically scanned to update the membership of each computer group according to the rules that correspond to the respective computer groups.

Service discovery is the process of discovering information (e.g., roles, components, relationships, etc.) regarding entities. Such information may be used for any of a variety of purposes, such as determining roles, instances, components, relationships, attributes, inventory, etc. of entities; grouping entities that share common attributes into a group (e.g., a computer group); monitoring status of entities; generating and presenting a diagram of entities and their interrelationships; defining targets for designated tasks; etc.

A service discovery class schema specifies types of entities and their relationships with other entities. The service discovery class schema includes a class and a relationship type, for example. A class represents the type of an entity. Examples of a class include but are not limited to a computer class, an SQL server class, etc. When a relationship exists between an instance of a first class and an instance of a second class, a relationship type is defined that describes that relationship.

A registry-based computer attribute is a type of service discovery schema that extends the computer class by adding new properties. A registry-based computer attribute definition defines how the attribute is discovered and populated. For instance, a registry-based computer attribute does not require a service discovery rule specified in a management pack. During runtime, dynamically created rules are used to generate discovery data that populates computer class properties that were added based on a registry-based computer attribute.

The definition of a registry-based computer attribute specifies a registry path or a value for a designated computer. The property value of an instance of a computer class becomes the value for that registry value on that computer. Registry-based computer attributes are used to determine information regarding a computer, such as the applications that are installed on the computer. For example, computer groups may use registry-based computer attributes to group computers that have designated application(s) installed.

A management pack may include any one or more of the example management pack element types described above. It will be recognized that these example management pack element types are provided for illustrative purposes and are not intended to be limiting. Persons skilled in the relevant art(s) will recognize that a management pack may include one or more other management pack element types that are not described above in addition to or in lieu of the example management pack element types described above.

In accordance with example embodiments, one type of management pack includes management pack elements that define a structure of one or more management packs that may be used in a system. Such a management pack is referred to as a "management pack management pack" (MPMP). For instance, a MPMP may define the types of management pack elements that a management pack may include. Further discussion of MPMPs and example structural and operational embodiments that utilize MPMPs are provided in the following sections with reference to FIGS. 1-10.

B. Example Computer Network Environment

One example environment in which management packs may be used is a computer network. FIG. 1 is a block diagram of an example computer network 100 in accordance with an embodiment. Generally speaking, computer network 100 operates to deploy configuration information that may be helpful for monitoring and managing clients in computer network 100, applications deployed thereon, information technology (IT) services, and/or other managers in computer network 100. As shown in FIG. 1, computer network 100 includes an administrator (admin) system 102, a manager 104, a database 106, and a plurality of clients 108A-108N. Communication among admin system 102, manager 104, database 106, and clients 108A-108N may be carried out over a wide area network, such as the Internet, using well-known network communication protocols. Additionally or alternatively, the communication may be carried out over a local area network (LAN) or another type of network.

Admin system 102 is a computer or other processing system, including one or more processors, which is configured to provide management packs to manager 104 at the direction of an administrative user who has access to admin system 102. For instance the administrative user may author and import a management pack to manager 104 using an interface client (e.g., a Web browser) that is installed on admin system 102. Admin system 102 may be further configured to review management reports generated by manager 104 regarding the results of monitoring and managing operations performed by manager 104 and/or notifications regarding events, alerts, performance data, etc. that are generated by clients 108A-108N. Further discussion of manager 104 and clients 108A-108N is provided below.

Manager 104 is at least one computer (e.g., server) or other processing system that is configured to monitor and manage performance of clients, applications deployed thereon, IT services, and/or other managers in a networked environment. For example, manager 104 may be a computer that is configured to execute an operations manager (e.g., Microsoft® System Center Operations Manager, published by Microsoft Corporation of Redmond, Wash.), which performs operations regarding applications and/or IT services running on computer network 100, such as cross-platform monitoring, service level monitoring, management pack authoring, etc. In another example, manager 104 may be a computer that is configured to execute a configuration manager (e.g., Microsoft® System Center Configuration Manager, published by Microsoft Corporation of Redmond, Wash.), which performs operations regarding configuration of clients, such as system deployment, task automation, compliance management, policy based security management, etc. These example managers are provided for illustrative purposes and are not intended to be limiting. Manager 104 may be any suitable type of manager.

Manager 104 is configured to validate management packs that are received from admin system 102 and to provide the management packs to database 106. One type of management pack that manager 104 receives from admin system 102 is a "management pack management pack" (MPMP). A MPMP defines a structure of management pack(s) that may be used in computer network 100. The entities defined by the MPMP are management packs having a structure defined by the MPMP. For instance, the MPMP may define the types of management pack elements that a management pack may include. Manager 104 provides instances of entities that are defined by management packs to an instance space that is materialized in database 106. Accordingly, manager 104 provides management packs having the structure that is defined by the MPMP (including the MPMP itself) to the instance space.

Manager 104 may be configured to deploy agents 110A-110N (e.g., software applications) on respective clients 108A-108N, though the scope of example embodiments is not limited in this respect. Manager 104 may be configured to generate reports regarding the results of its monitoring and managing operations and/or regarding notifications of events, alerts, performance data, etc. that are generated by clients 108A-108N. Further discussion of agents 110A-110N and clients 108A-108N is provided below.

Database 106 is at least one storage device that stores instances of entities that are defined by management packs. In accordance with example embodiments, database 106 materializes the instance space that is described by the MPMP. Accordingly, database 106 stores instances of management packs having the structure defined by the MPMP (including the MPMP itself) in the instance space. For example, the MPMP itself is an example of a management pack having the structure defined by the MPMP. Thus, database 106 stores the MPMP, along with other instances of management packs having the structure defined by the MPMP, in the instance space. It will be recognized that database 106 stores instances of other entities that are described by management packs in the instance space, as well. Database 106 may be a structured query language (SQL) database, a relational database, or any other suitable type of database.

Clients 108A-108N are computers or other processing systems that execute respective applications. For instance, client 108A executes application(s) 112A, client 108B executes application(s) 112B, and so on. Agents 110A-110N may be deployed on respective clients 108A-108N by manager 104. An agent monitors applications running on a respective client and notifies a manager of events, alerts, performance data, etc. that are generated by the applications. For example, agent 110A monitors application(s) 112A, agent 110B monitors application(s) 112B, and so on. It should be noted that clients 108A-108N need not necessarily include agents 110A-110N. For instance, manager 104 may communicate directly with clients 108A-108N, rather than communicating with clients 108A-108N through respective agents 110A-110N.

When manager 104 receives a notification of an event or alert, for example, from an agent, manager 104 applies a filtering rule that is specified in a respective management pack element to the event or alert. For instance, each filtering rule may specify an action to be taken with regard to a respective event or alert. The action may include sending a notification message (e.g., an email or paper message) to an administrative user via admin system 102, generating a network support ticket, triggering a workflow for correcting the event or alert, etc.

Figure 2:
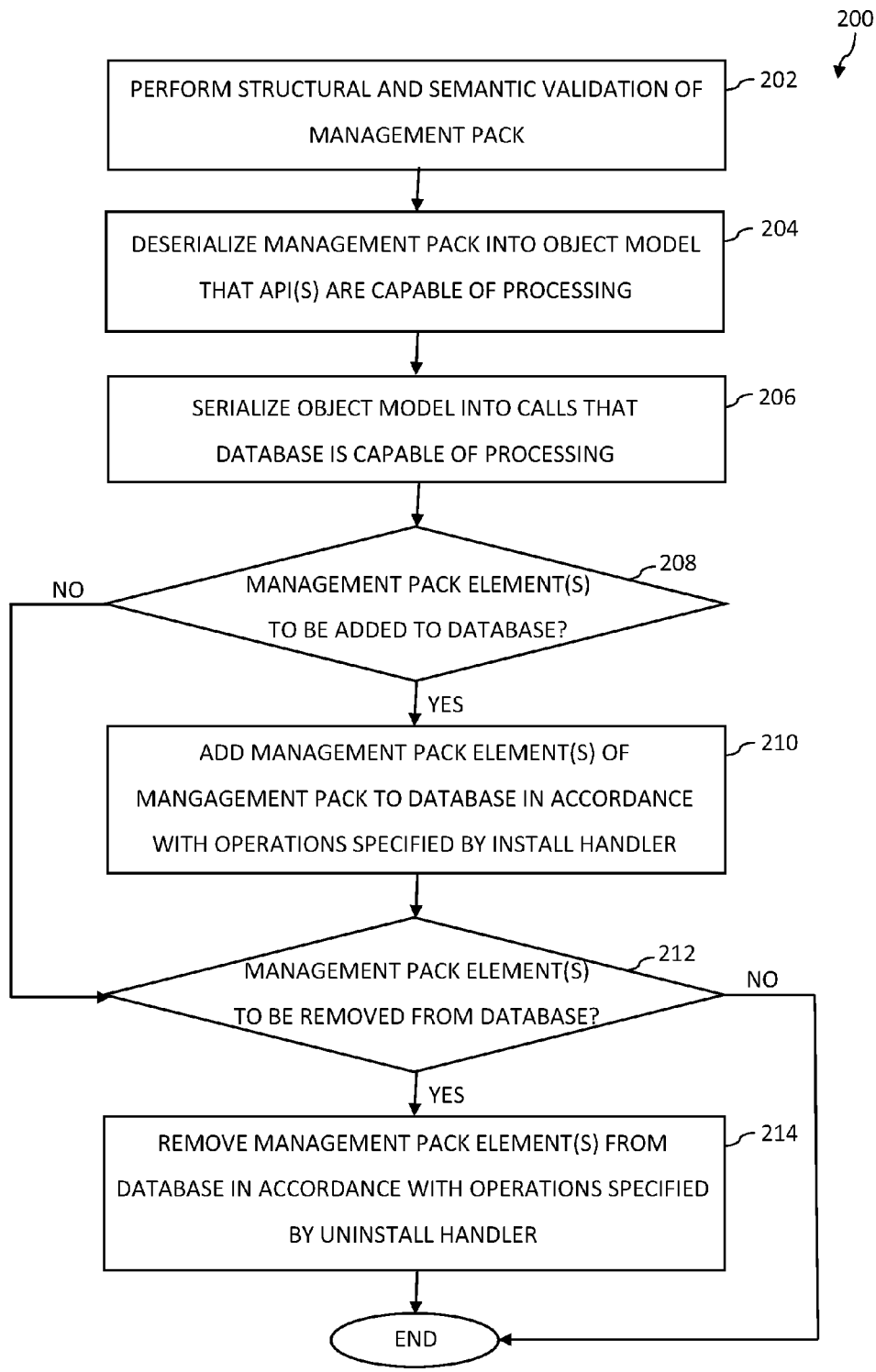
FIG. 2 depicts a flowchart of a method for importing a management pack into a database in accordance with an embodiment.

FIG. 2 depicts a flowchart 200 of a method for importing a management pack into a database (e.g., database 106) in accordance with an embodiment. Flowchart 200 is described from the perspective of a manager. Flowchart 200 may be performed by manager 104 of computer network 100 shown in FIG. 1, for example. For illustrative purposes, flowchart 200 is described with respect to a manager 104' shown in FIG. 3, which is an example of manager 104, according to an embodiment. In this document, whenever a prime is used to modify a reference number, the modified reference number indicates an example (or alternate) implementation of the element that corresponds to the reference number.

Figure 3:
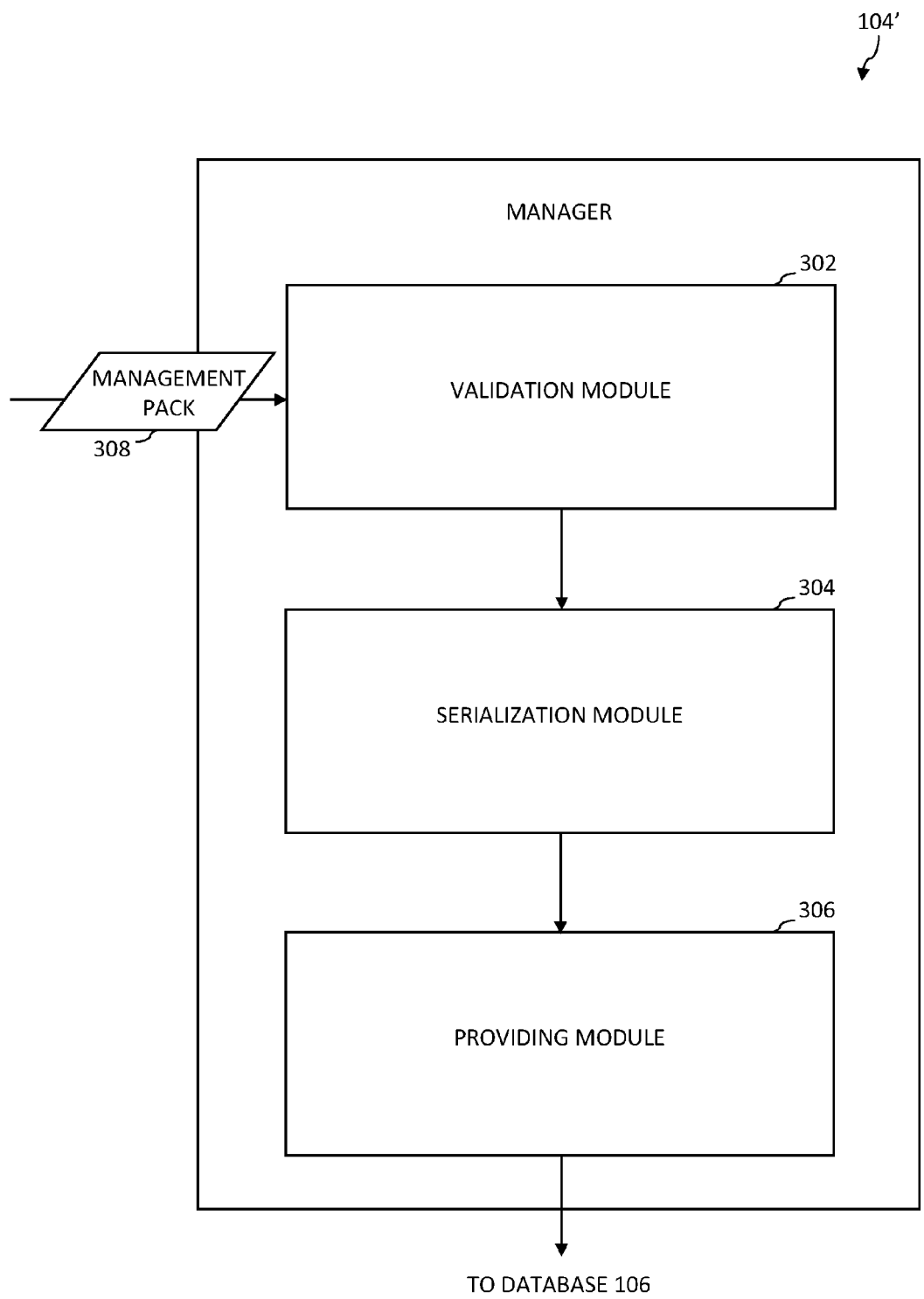
FIG. 3 is a block diagram of an example implementation of a manager shown in FIG. 1 in accordance with an embodiment.

As shown in FIG. 3, manager 104' includes a validation module 302, a serialization module 304, and a providing module 306. Further structural and operational embodiments will be apparent to persons skilled in the relevant art(s) based on the discussion regarding flowchart 200. Flowchart 200 is described as follows.

As shown in FIG. 2, the method of flowchart 200 begins at step 202. In step 202, a structural and semantic validation of a management pack is performed. In an example implementation, validation module 302 of FIG. 3 performs the structural and semantic validation of management pack 308.

At step 204, the management pack is de-serialized into an object model that application programming interface(s) (APIs) are capable of processing. For instance, the API(s) may be present on respective clients (e.g., clients 108A-108N) of a system (e.g., computer network 100). In an example implementation, serialization module 304 de-serializes management pack 308 into the object model.

At step 206, the object model is serialized into calls that a database (e.g., database 106 is capable of processing. In an example implementation, serialization module 304 serializes the object model into the calls to the database.

At step 208, a determination is made as to whether management pack element(s) are to be added to the database. If no management pack elements are to be added to the database, control flows to step 212. However, if management pack element(s) are to be added to the database, control flows to step 210. In an example implementation, providing module 306 determines whether management pack element(s) are to be added to the database.

For example, management pack elements that are included in the management pack may be compared to management pack elements that are present in the database to determine whether the management pack includes element(s) that are not present in the database. If the management pack includes element(s) that are not present in the database, a determination may be made to add those elements to the database. Otherwise, a determination may be made not to add elements to the database.

At step 210, management pack element(s) of the management pack are added to the database in accordance with operations specified by an install handler. An install handler is a module (e.g., software module) that is configured to add management pack elements to a database. In accordance with an example implementation, providing module 306 adds management pack element(s) of management pack 308 to the database.

At step 212, a determination is made as to whether management pack element(s) are to be removed from the database. If no management pack elements are to be removed from the database, the method of flowchart 200 ends. However, if management pack element(s) are to be removed from the database, control flows to step 214. In an example implementation, providing module 306 determines whether management pack element(s) are to be removed from the database.

For example, management pack elements that were previously included in the management pack may be present in the database. One or more of those management pack elements may have been removed from the management pack in the interim. The current management pack elements of the management pack may be compared to the management pack elements that are present in the database. A determination may be made to remove management pack element(s) that are present in the database that are not currently included in the management pack. Accordingly, the management pack elements that are stored in the database may be updated to reflect the management pack elements that are currently included in the management pack. However, if the management pack elements that are stored in the database are the same as the management pack elements that are currently included in the management pack, a determination may be made that no management pack elements are to be removed from the database.

At step 214, management pack element(s) of the management pack are removed from the database in accordance with operations specified by an uninstall handler. An uninstall handler is a module (e.g., software module) that is configured to remove management pack elements from a database. In accordance with an example implementation, providing module 306 removes management pack element(s) of management pack 308 from the database. FIG. 2 illustrates one example technique of importing a management pack into a database and is not intended to be limiting. Other suitable techniques are within the spirit and scope of the example embodiments.

Figure 4:
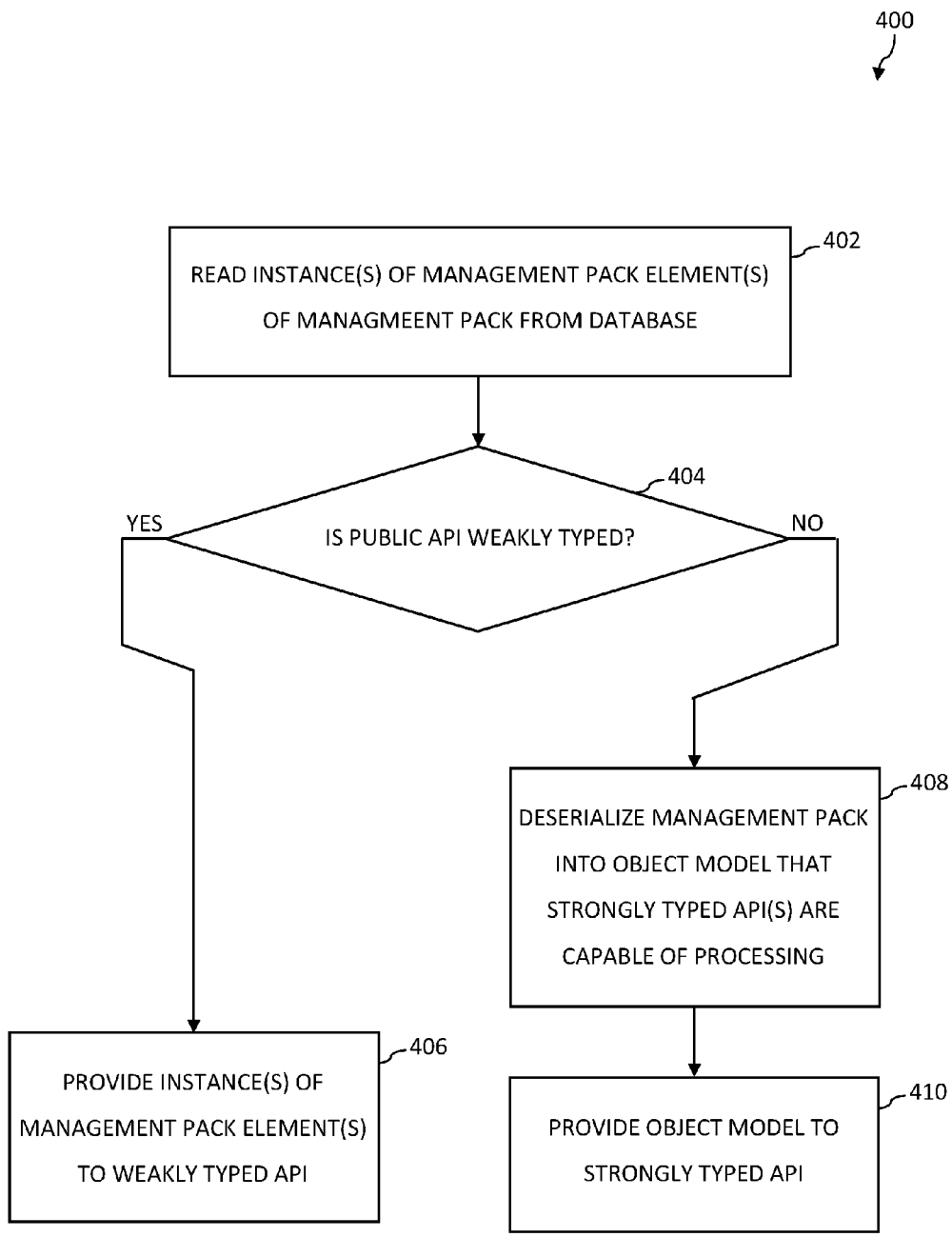
FIG. 4 depicts a flowchart of a method for retrieving a management pack from a database in accordance with an embodiment.
Figure 5:
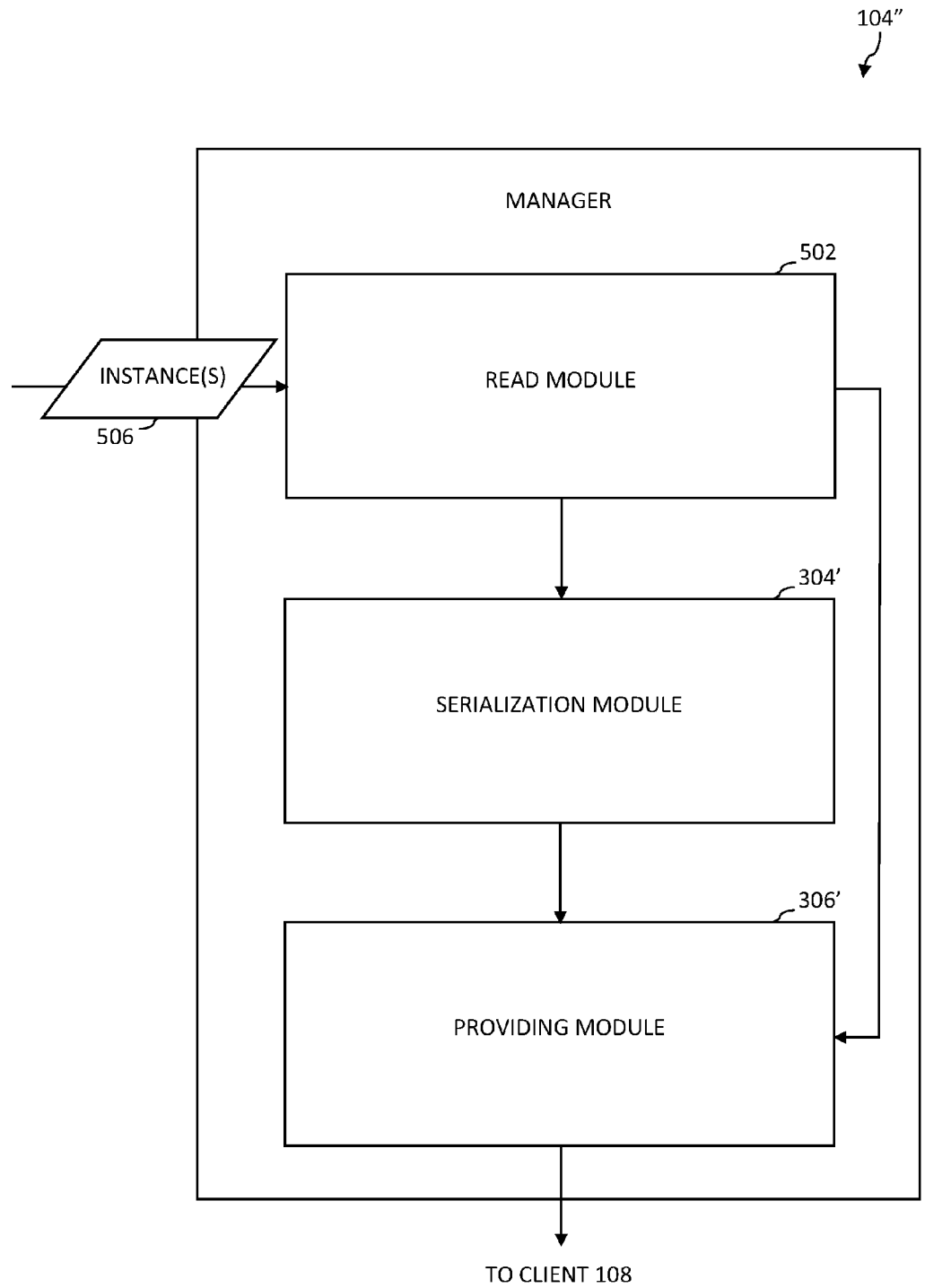
FIG. 5 is a block diagram of another example implementation of a manager shown in FIG. 1 in accordance with an embodiment.

FIG. 4 depicts a flowchart 400 of a method for retrieving a management pack from a database (e.g., database 106) in accordance with an embodiment. For instance, once a management pack is imported into a database in accordance with the method of flowchart 200 in FIG. 2, the management pack may be retrieved in accordance with the method of flowchart 400 for processing by a client (e.g., any of clients 108A-108N). Flowchart 400 is described from the perspective of a manager. Flowchart 400 may be performed by manager 104 of computer network 100 shown in FIG. 1, for example. For illustrative purposes, flowchart 400 is described with respect to a manager 104" shown in FIG. 5, which is an example of manager 104, according to an embodiment. As shown in FIG. 5, manager 104" includes a read module 502, a serialization module 304', and a providing module 306'. Further structural and operational embodiments will be apparent to persons skilled in the relevant art(s) based on the discussion regarding flowchart 400. Flowchart 400 is described as follows.

As shown in FIG. 4, the method of flowchart 400 begins at step 402. In step 402, instance(s) of management pack element(s) of a management pack are read from a database (e.g., database 106). In an example implementation, read module 502 of FIG. 5 reads instance(s) 506 of management pack element(s) of a management pack from the database.

At step 404, a determination is made as to whether a public application programming interface (API) is weakly typed. For example, the public API may be present on a client (e.g., any of clients 108A-108N) of a system (e.g., computer network 100). In this example, the client determines whether to use a weakly typed API. An API that is not weakly typed is referred to as "strongly typed." Weakly typed and strongly typed APIs are discussed in greater detail below.

A weakly typed API is an API that is configured to pass an "enterprise management object" object type that represents an instance of a management pack element. For instance, the "enterprise management object" object type may include a string (e.g., character string or numeric string) that includes the "title" of the instance. A weakly typed API may be the same for all management pack element types. A weakly typed API may be used for common requests, for example, for which response time and overhead are substantial priorities.

A strongly typed API, on the other hand, is an API that passes a management pack class object, which is an object in terms of a software framework class (e.g., a Microsoft® .NET framework class). For instance, each instance of the management pack class object may include a wrapper for making programming against the instances easier. A strongly typed API may vary based on management pack element type. For instance, a return type for functions on a strongly typed API may return different formats of a management pack element depending on the type of the management pack element.

If the API is weakly typed, control flows to step 406. However, if the API is not weakly typed (i.e., is strongly typed), control flows to step 408. In an example implementation, providing module 306' determines whether the public API is weakly typed.

At step 406, the instance(s) of the management pack element(s) are provided to the weakly typed API. In an example implementation, providing module 306' provides the instance(s) to the weakly typed API.

At step 408, the management pack is de-serialized into an object model that strongly typed APIs are capable of processing. In an example implementation, serialization module 304' de-serializes the management pack into the object model.

At step 410, the object model is provided to the strongly typed API. In an example implementation, providing module 306' provides the object model to the strongly typed API. FIG. 4 illustrates one example technique of retrieving a management pack from a database and is not intended to be limiting. Other suitable techniques are within the spirit and scope of the example embodiments.

C. Further Detail Regarding Example Structural and Operational Embodiments

Figure 6:
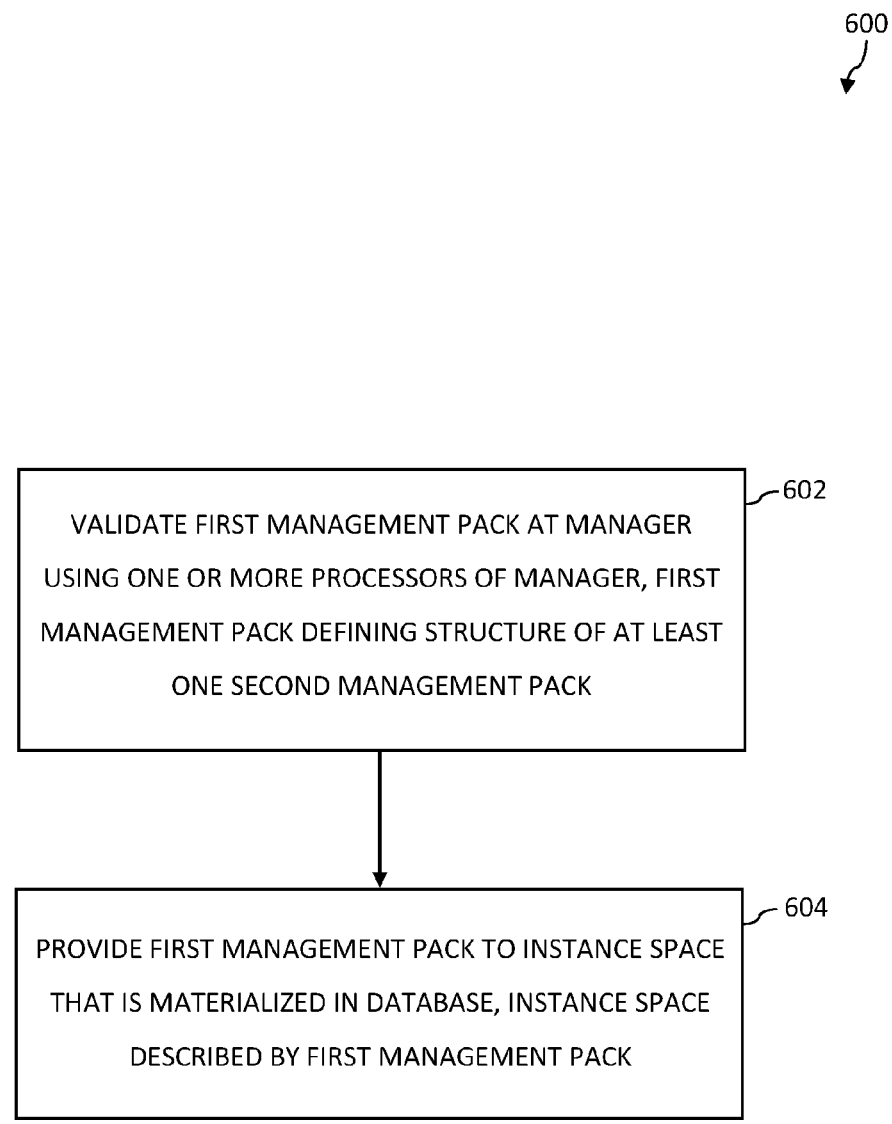
FIG. 6 depicts a flowchart of a method for providing a management pack to an instance space that is materialized in a database in accordance with an embodiment.

FIG. 6 depicts a flowchart 600 of a method for providing a "management pack management pack" (MPMP) to an instance space that is materialized in a database in accordance with an embodiment. The method of flowchart 600 is an example implementation of the method of flowchart 200 described above with reference to FIG. 2. It should be noted that the method of flowchart 600 need not necessarily include all of steps 202, 204, 206, 208, 210, 212, and 214 of flowchart 200. Moreover, the method of flowchart 600 may include one or more steps that are not included in the method of flowchart 200.

Figure 7:
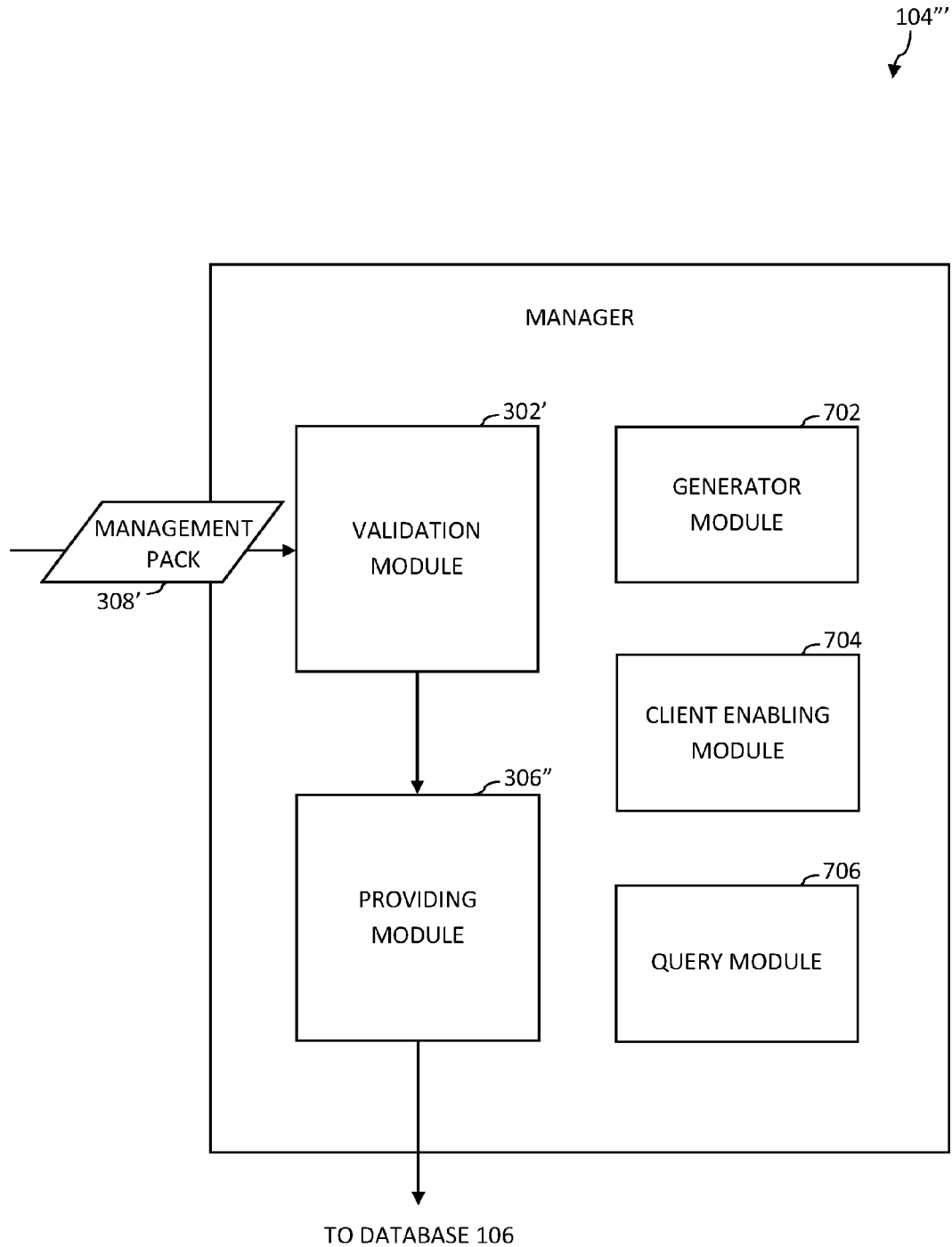
FIG. 7 is a block diagram of yet another example implementation of a manager shown in FIG. 1 in accordance with an embodiment.

Flowchart 600 is described from the perspective of a manager. Flowchart 600 may be performed by manager 104 of computer network 100 shown in FIG. 1, for example. For illustrative purposes, flowchart 600 is described with respect to a manager 104''' shown in FIG. 7, which is an example of manager 104, according to an embodiment. As shown in FIG. 7, manager 104''' includes a validation module 302', a providing module 306'', a generator module 702, a client enabling module 704, and a query module 706. Further structural and operational embodiments will be apparent to persons skilled in the relevant art(s) based on the discussion regarding flowchart 600. Flowchart 600 is described as follows.

As shown in FIG. 6, the method of flowchart 600 begins at step 602. In step 602, a first management pack is validated at a manager (e.g., manager 104) using one or more processors of the manager. The first management pack defines a structure of at least one second management pack. Accordingly, the first management pack may be referred to as a MPMP. In an example implementation, validation module 302' of FIG. 7 validates management pack 308'. For instance, management pack 308' may define the structure of the at least one second management pack.

According to an embodiment, the first management pack specifies at least one of a management pack type definition or a management pack class definition that is associated with the at least one second management pack. In accordance with another embodiment, the at least one second management pack is validated at the manager based on the structure defined by the first management pack. For instance, validation module 302' may validate the at least one second management pack based on the structure defined by the first management pack.

At step 604, the first management pack is provided to an instance space that is materialized in a database (e.g., database 106). The instance space is described by the first management pack. In an example implementation, providing module 306'' provides the first management pack to the instance space that is materialized in the database.

In FIG. 7, generator module 702 is configured to automatically perform one or more operations in response to validation module 302' receiving a management pack element that satisfies one or more criteria of the at least one second management pack. In a first example implementation, generator module 702 automatically generates a serialization object model corresponding to the management pack element based on the first management pack. In a second example implementation, generator module 702 automatically installs a handler corresponding to the management pack element to perform a serialization operation with respect to the management pack element. In a third example implementation, generator module 702 automatically performs a validation handler operation for structurally and/or semantically validating the management pack element. For instance, validation module 302' or a portion thereof may be included in generator module 702. In a fourth example implementation, generator module 702 automatically generates an API for retrieving one or more instances of the management pack element from the database. For instance, generator module 702 may provide the API to a client (e.g., any of clients 108A-108N), so that the client may use the API to retrieve instance(s) of the management pack element from the database.

Client enabling module 704 is configured to enable a client (e.g., any of clients 108A-108N) to interpret the at least one second management pack. For instance, client enabling module 704 may provide software code to a client that includes instructions for interpreting the at least one second management pack. Query module 706 is configured to query the database for instances of entities that are described in management packs. For example, query module 706 may be configured to query the database for an instance of a management pack element that is included in the first management pack and/or the at least one second management pack. In another example, query module 706 may be configured to query the database for an instance of the at least one second management pack.

Figure 8:
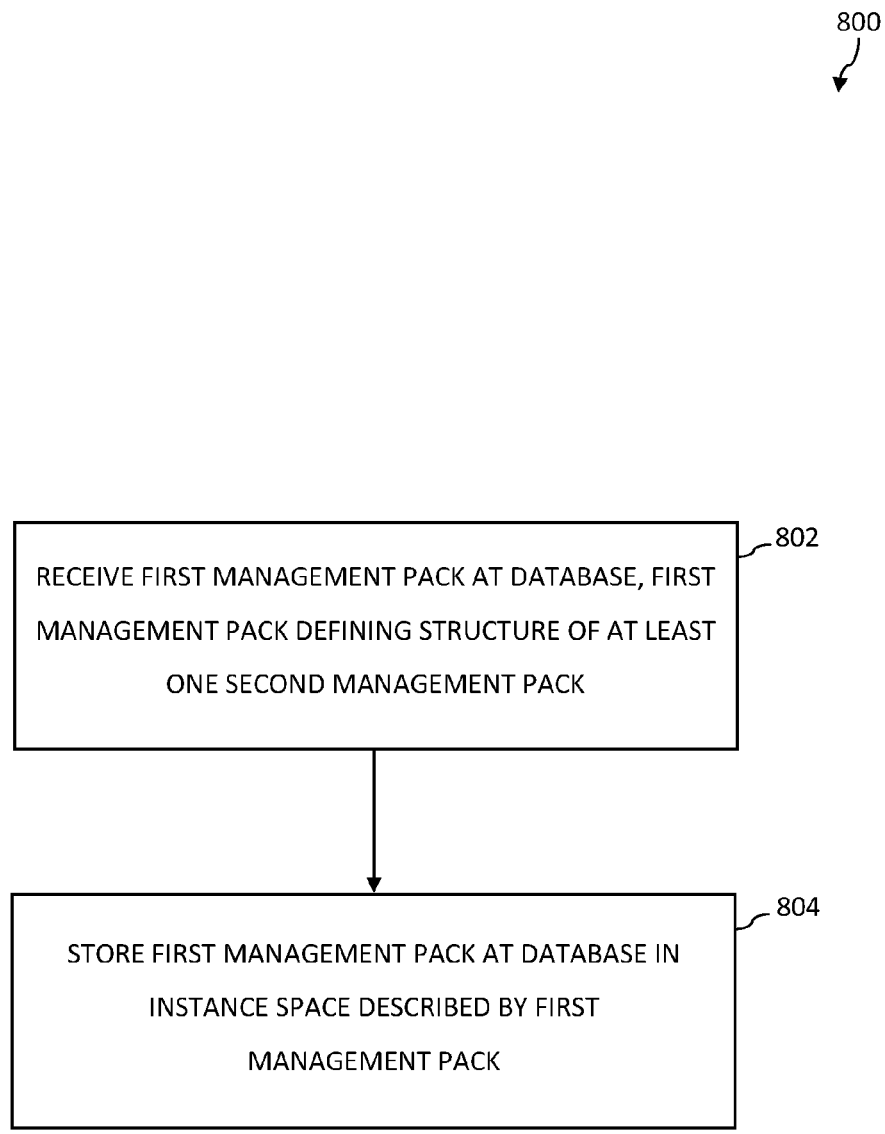
FIG. 8 depicts a flowchart of a method for storing a management pack in an instance space that is materialized in a database in accordance with an embodiment.

FIG. 8 depicts a flowchart 800 of a method for storing a "management pack management pack" (MPMP) in an instance space that is materialized in a database in accordance with an embodiment. The method of flowchart 800 is an example implementation of the method of flowchart 200 described above with reference to FIG. 2. Flowchart 800 is described from the perspective of a database; whereas, flowchart 200 is described from the perspective of a manager. Thus, it should be noted that the method of flowchart 800 need not necessarily include steps corresponding to respective steps 202, 204, 206, 208, 210, 212, and 214 of flowchart 200. For instance, some of the steps of flowchart 200 may be performed independently of a database. Similarly, the method of flowchart 800 may include one or more steps that do not correspond to steps 202, 204, 206, 208, 210, 212, and/or 214 of flowchart 200. For instance, some of the steps of flowchart 800 may be performed independently of a manger.

Figure 9:
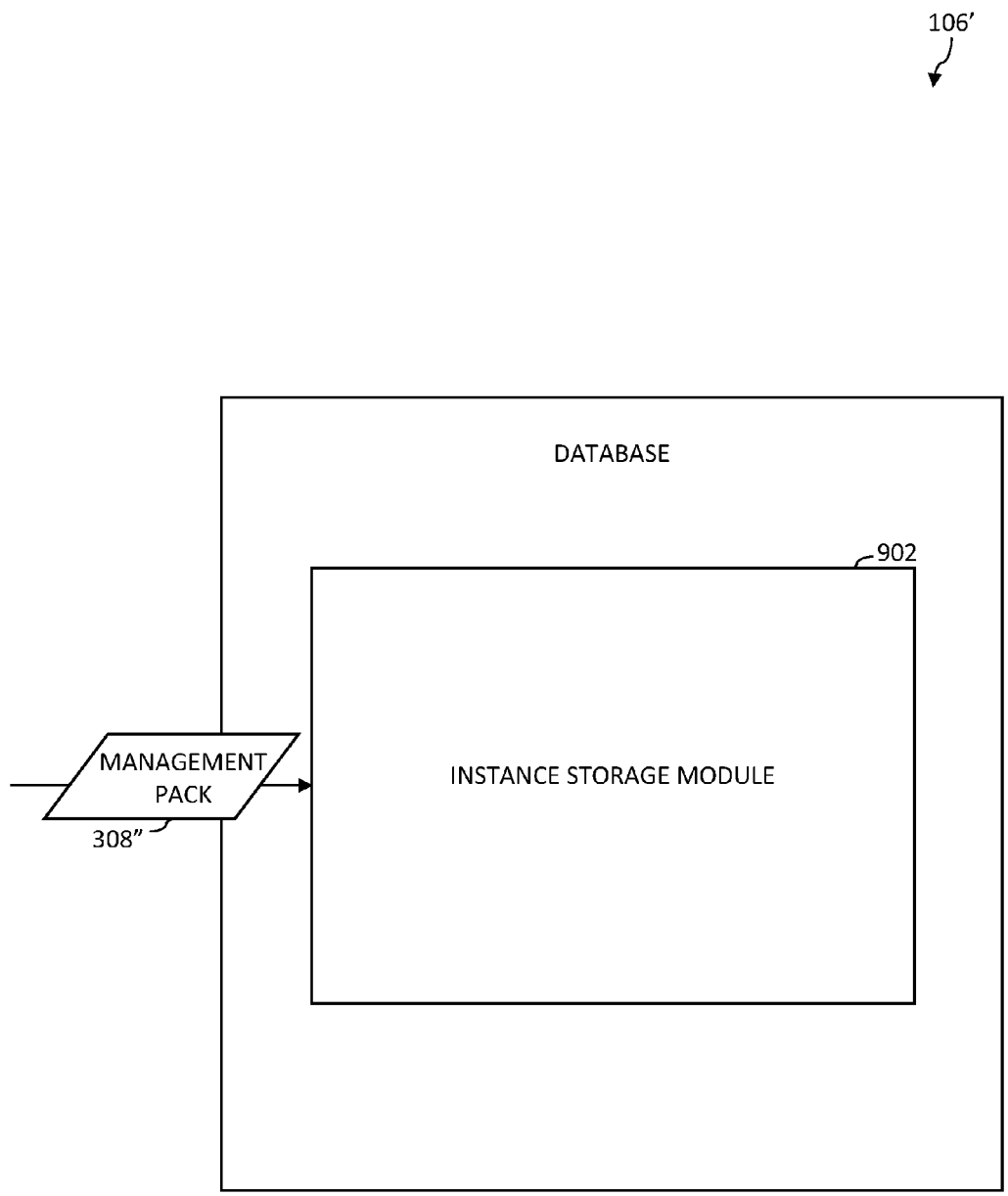
FIG. 9 is a block diagram of an example implementation of a database shown in FIG. 1 in accordance with an embodiment.

Flowchart 800 may be performed by database 106 of computer network 100 shown in FIG. 1, for example. For illustrative purposes, flowchart 800 is described with respect to a database 106' shown in FIG. 9, which is an example of database 106, according to an embodiment. As shown in FIG. 9, database 106' includes an instance storage module 902. Further structural and operational embodiments will be apparent to persons skilled in the relevant art(s) based on the discussion regarding flowchart 800. Flowchart 800 is described as follows.

As shown in FIG. 8, the method of flowchart 800 begins at step 802. In step 802, a first management pack is received at a database. The first management pack defines a structure of at least one second management pack. Accordingly, the first management pack may be referred to as a MPMP. In an example implementation, management pack 308″ of FIG. 9 is the first management pack. In accordance with this example implementation, instance storage module 902 receives management pack 308″.

At step 804, the first management pack is stored at the database in an instance space described by the first management pack. In an example implementation, instance storage module 902 stores management pack 308″ in an instance space described by management pack 308″.

According to an embodiment, the at least one second management pack is stored at the database in the instance space described by the first management pack. For instance, instance storage module 902 may store the at least one second management pack in the instance space described by the first management pack.

In accordance with another embodiment, an instance of a management pack element that is included in the first management pack and/or the at least one second management pack is stored at the database in the instance space described by the first management pack. For example, instance storage module 902 may store the instance of the management pack element that is included in the first management pack and/or the at least one second management pack in the instance space described by the first management pack. In further accordance with this embodiment, the instance of the management pack element that is included in the first management pack and/or the at least one second management pack may be provided in response to receiving a query for an instance that satisfies one or more criteria, which are specified by the management pack element. For example, instance storage module 902 may provide the instance.

According to yet another embodiment, an instance of an entity that is defined by a management pack that is included in the at least one second management pack is stored at the database in the instance space described by the first management pack. For example, instance storage module 902 may store the instance of the entity that is defined by the management pack that is included in the at least one second management pack in the instance space described by the first management pack. In further accordance with this embodiment, the instance of the entity may be provided in response to receiving a query for an instance that satisfies one or more criteria, which are specified by the management pack that is included in the at least one second management pack.

In still another embodiment, the first management pack specifies at least one of a management pack type definition or a management pack class definition that is associated with the at least one second management pack.

Figure 10:
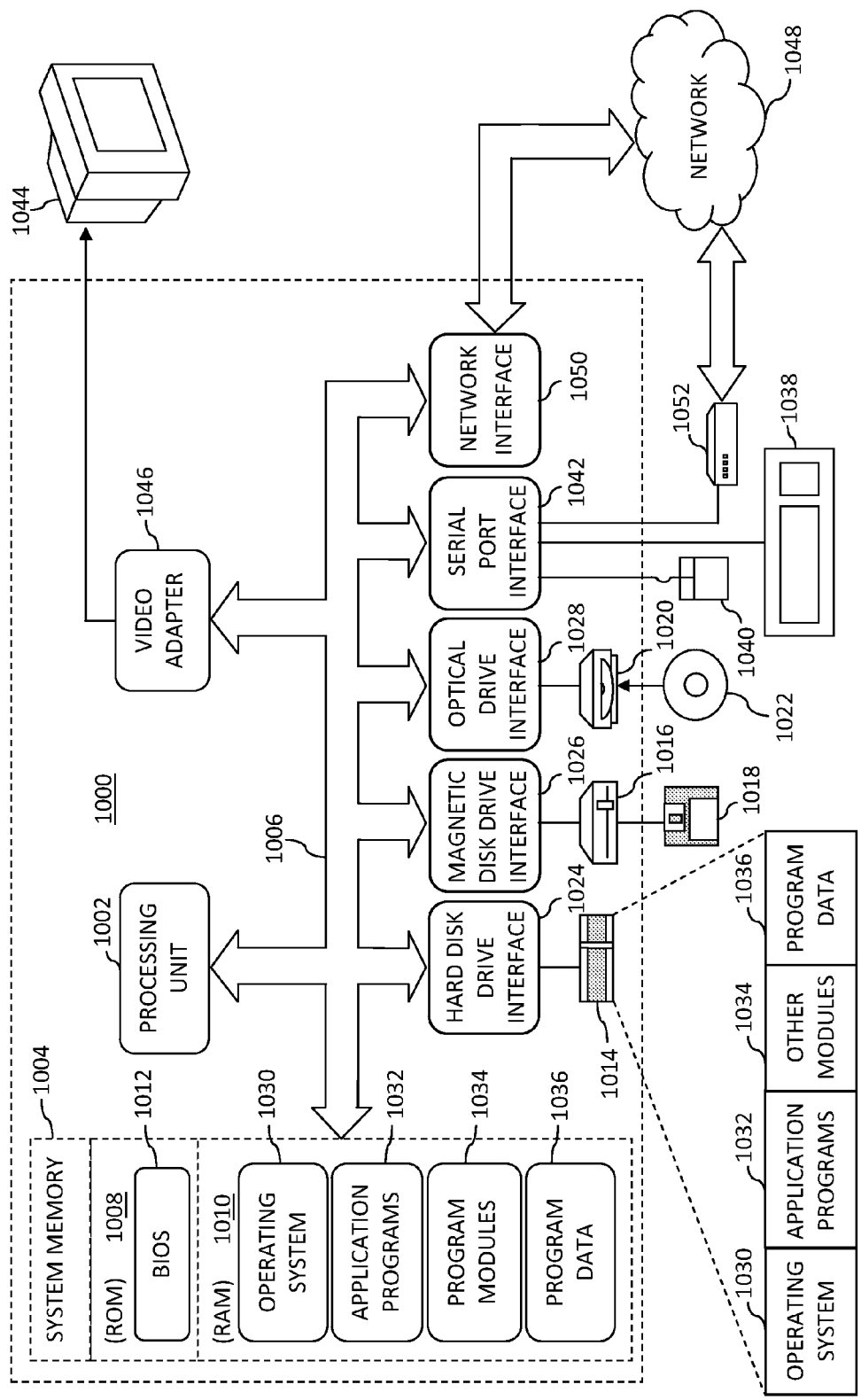
FIG. 10 depicts an example computer in which embodiments may be implemented.

FIG. 10 depicts an example computer 1000 in which embodiments may be implemented. Any one or more of the admin system 102, manager 104, database 106, or clients 108A-108N shown in FIG. 1 (or any one or more subcomponents thereof shown in FIGS. 3, 5, and 7) may be implemented using computer 1000, including one or more features of computer 1000 and/or alternative features. Computer 1000 may be a general-purpose computing device in the form of a conventional personal computer, a mobile computer, or a workstation, for example, or computer 1000 may be a special purpose computing device. The description of computer 1000 provided herein is provided for purposes of illustration, and is not intended to be limiting. Embodiments may be implemented in further types of computer systems, as would be known to persons skilled in the relevant art(s).

As shown in FIG. 10, computer 1000 includes a processing unit 1002, a system memory 1004, and a bus 1006 that couples various system components including system memory 1004 to processing unit 1002. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computer 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1030, one or more application programs 1032, other program modules 1034, and program data 1036. Application programs 1032 or program modules 1034 may include, for example, computer program logic for implementing any one or more of agents 110A-110N, applications 112A-112N, validation module 302, serialization module 304, providing module 306, read module 502, serialization module 304′, providing module 306′, validation module 302′, providing module 306″, generator module 702, client enabling module 704, query module 706, instance storage module 902, flowchart 200 (including any step of flowchart 200), flowchart 400 (including any step of flowchart 400), flowchart 600 (including any step of flowchart 600), and/or flowchart 800 (including any step of flowchart 800), as described herein.

A user may enter commands and information into the computer 1000 through input devices such as keyboard 1038 and pointing device 1040. Other input devices (not shown) may include a microphone, joystick, game pad, satellite dish, scanner, or the like. These and other input devices are often connected to the processing unit 1002 through a serial port interface 1042 that is coupled to bus 1006, but may be connected by other interfaces, such as a parallel port, game port, or a universal serial bus (USB).

A monitor 1044 or other type of display device is also connected to bus 1006 via an interface, such as a video adapter 1046. In addition to the monitor, computer 1000 may include other peripheral output devices (not shown) such as speakers and printers.

Computer 1000 is connected to a network 1048 (e.g., the Internet) through a network interface or adapter 1050, a modem 1052, or other means for establishing communications over the network. Modem 1052, which may be internal or external, is connected to bus 1006 via serial port interface 1042.

As used herein, the terms "computer program medium" and "computer-readable medium" are used to generally refer to media such as the hard disk associated with hard disk drive 1014, removable magnetic disk 1018, removable optical disk 1022, as well as other media such as flash memory cards, digital video disks, random access memories (RAMs), read only memories (ROM), and the like.

As noted above, computer programs and modules (including application programs 1032 and other program modules 1034) may be stored on the hard disk, magnetic disk, optical disk, ROM, or RAM. Such computer programs may also be received via network interface 1050 or serial port interface 1042. Such computer programs, when executed or loaded by an application, enable computer 1000 to implement features of embodiments discussed herein. Accordingly, such computer programs represent controllers of the computer 1000.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method comprising:
   validating a first management pack at a manager using one or more processors of the manager, the first management pack defining a structure of the first management pack and at least one second management pack; and
   providing the first management pack to an instance space that is materialized in a database, the instance space described by the first management pack.

2. The method of claim 1, further comprising:
   validating the at least one second management pack at the manager based on the structure defined by the first management pack.

3. The method of claim 1, further comprising:
   enabling a client to interpret the at least one second management pack.

4. The method of claim 1, further comprising:
   querying the database for an instance of the at least one second management pack.

5. The method of claim 1, further comprising:
   querying the database for an instance of an entity that is defined by the at least one second management pack.

6. The method of claim 1, wherein the first management pack specifies at least one of a management pack type definition or a management pack class definition that is associated with the at least one second management pack.

7. The method of claim 1, further comprising:
   receiving a management pack element that satisfies one or more criteria of the at least one second management pack; and
   automatically generating a serialization object model corresponding to the management pack element based on the first management pack.

8. The method of claim 1, further comprising:
   receiving a management pack element that satisfies one or more criteria of the at least one second management pack; and
   automatically installing a handler corresponding to the management pack element to perform a serialization operation with respect to the management pack element.

9. The method of claim 1, further comprising:
   receiving a management pack element that satisfies one or more criteria of the at least one second management pack; and
   automatically performing a validation handler operation for semantically validating the management pack element.

10. The method of claim 1, further comprising:
    receiving a management pack element that satisfies one or more criteria of the at least one second management pack; and
    automatically generating an application programming interface for retrieving one or more instances of the management pack element from the database.

11. A method comprising:
    receiving a first management pack at a database, the first management pack defining a structure of the first management pack and at least one second management pack; and
    storing the first management pack at the database in an instance space described by the first management pack.

12. The method of claim 11, further comprising:
    storing the at least one second management pack at the database in the instance space described by the first management pack.

13. The method of claim 11, further comprising:
    storing an instance of a management pack element that is included in the first management pack at the database in the instance space described by the first management pack.

14. The method of claim 11, further comprising:
    storing an instance of an entity that is defined by a management pack that is included in the at least one second management pack at the database in the instance space described by the first management pack.

15. The method of claim 14, further comprising:
    providing the instance of the entity in response to receiving a query for an instance that satisfies one or more criteria, which are specified by the management pack that is included in the at least one second management pack.

16. The method of claim 11, wherein the first management pack specifies at least one of a management pack type definition or a management pack class definition that is associated with the at least one second management pack.

17. A manager comprising:
a validation module executed in at least one processor and having logic configured to validate a first management pack that defines a structure of the first management pack and at least one second management pack, the validation module further configured to validate the at least one second management pack based on the structure defined by the first management pack; and
a providing module configured to provide the first management pack to an instance space that is materialized in a database, the instance space described by the first management pack.

18. The manager of claim 17, further comprising:
a client enabling module configured to enable a client to interpret the at least one second management pack.

19. The manager of claim 17, further comprising:
a query module configured to query the database for an instance of a management pack element that is included in the at least one second management pack.

20. The manager of claim 17, wherein the first management pack specifies at least one of a management pack type definition or a management pack class definition that is associated with the at least one second management pack.

\* \* \* \* \*